US008458799B2

(12) United States Patent
Fu et al.

(10) Patent No.: US 8,458,799 B2
(45) Date of Patent: Jun. 4, 2013

(54) METHOD AND APPARATUS FOR PROVIDING A SCALABLE SERVICE PLATFORM USING A NETWORK CACHE

(75) Inventors: Yan Fu, Espoo (FI); Ari Vepsäläinen, Espoo (FI); Ari Antero Aarnio, Espoo (FI); Markku Kalevi Vimpari, Oulu (FI); Pekka Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 871 days.

(21) Appl. No.: 12/495,071

(22) Filed: Jun. 30, 2009

(65) Prior Publication Data

US 2010/0332834 A1    Dec. 30, 2010

(51) Int. Cl.
*G06F 7/04* (2006.01)
(52) U.S. Cl.
USPC .............................. 726/26; 380/278; 380/281
(58) Field of Classification Search
USPC ..................................... 726/26; 380/278, 281
See application file for complete search history.

(56) References Cited

U.S. PATENT DOCUMENTS

| 6,629,243 | B1 * | 9/2003 | Kleinman et al. ............ 713/163 |
| 7,035,911 | B2 | 4/2006 | Lowery et al. |
| 7,051,201 | B2 | 5/2006 | Cuomo et al. |
| 7,134,139 | B2 | 11/2006 | Hetzler et al. |
| 7,137,143 | B2 | 11/2006 | Chawla et al. |
| 7,849,207 | B2 * | 12/2010 | Kazmi et al. .................. 709/232 |
| 2008/0005568 | A1 | 1/2008 | Watson et al. |
| 2009/0154704 | A1 | 6/2009 | Farrugia et al. |

FOREIGN PATENT DOCUMENTS

WO    WO-03/007575    1/2003

OTHER PUBLICATIONS

Authentication Cache Settings. Aug. 26, 2009, pp. 1-2, Version 7.0, http://publib.boulder.ibm.com/infocenter/wasinfo/v7r0/index.jsp?topic=/com.ibm.websphere.base.doc/info/aes.
Caching Tutorial for Web Authors and Webmasters. Apr. 14, 2009, pp. 1-13, Version 1.84, http://www.mnot.net/cache_docs/.
Ellison, J.: Authenticated User Page Caching (Authcache). Mar. 8, 2009, pp. 1-5, http://drupal.org/project/authcache.
Fuchs, S.: HTTP-Authenticated Rails Page Caching. Mar. 31, 2008, pp. 1-5, http://www.artweb-design.de/2008/3/31/http-authenticated-rails-page-caching.

* cited by examiner

*Primary Examiner* — Christopher Brown
(74) *Attorney, Agent, or Firm* — Ditthavong Mori & Steiner P.C.

(57) ABSTRACT

An approach is provided for building a scalable service platform by initiating transmission of encrypted data from a public network cache. An access control server platform determines a first authorization key for a user and a second authorization key for a resource, and then encrypts the resource with the second authorization key, and encrypts the second authorization key with the first authorization key. The access control server platform initiates distribution of the encrypted second authorization key with the encrypted resource over a network. The access control server platform further initiates caching the encrypted second authorization key with the encrypted resource that meets a predefined threshold value (e.g., a data size, an access frequency, a modification frequency, or an auditing requirement) in a cache in the network, and initiates transmission of the cached and encrypted second authorization key with the cached and encrypted resource from the cache to at least one authorized entity.

17 Claims, 11 Drawing Sheets

400

METHOD AND APPARATUS FOR PROVIDING A SCALABLE SERVICE PLATFORM USING A NETWORK CACHE

BACKGROUND

Service providers (e.g., wireless, cellular, etc.) and device manufacturers are continually challenged to deliver value and convenience to consumers by, for example, providing compelling network services and advancing the underlying technologies. One area of interest has been in the manner access to data is controlled. As content (e.g., photos and videos) sharing continues to grow in popularity, service providers must support a large amount of users and associated requests for such content.

SOME EXAMPLE EMBODIMENTS

According to one embodiment, a method comprises determining a first authorization key for a user and a second authorization key for a resource. The method also comprises encrypting the resource with the second authorization key, and encrypting the second authorization key with the first authorization key. The method further comprises initiating distribution of the encrypted second authorization key with the encrypted resource over a network. The method further comprises initiating caching the encrypted second authorization key with the encrypted resource in a cache in the network, and initiating transmission of the cached and encrypted second authorization key with the cached and encrypted resource from the cache to at least one authorized entity.

According to another embodiment, an apparatus comprising at least one processor, and at least one memory including computer program code, the at least one memory and the computer program code configured to, with the at least one processor, cause the apparatus to determine a first authorization key for a user and a second authorization key for a resource. The apparatus is also caused to encrypt the resource with the second authorization key, and to encrypt the second authorization key with the first authorization key. The apparatus is further caused to initiate distribution of the encrypted second authorization key with the encrypted resource over a network. The apparatus is further caused to initiate caching the encrypted second authorization key with the encrypted resource in a cache in the network, and initiate transmission of the cached and encrypted second authorization key with the cached and encrypted resource from the cache to at least one authorized entity.

According to another embodiment, a computer-readable storage medium carrying one or more sequences of one or more instructions which, when executed by one or more processors, cause an apparatus to determine a first authorization key for a user and a second authorization key for a resource. The apparatus is also caused to encrypt the resource with the second authorization key, and to encrypt the second authorization key with the first authorization key. The apparatus is further caused to initiate distribution of the encrypted second authorization key with the encrypted resource over a network. The apparatus is further caused to initiate caching the encrypted second authorization key with the encrypted resource in a cache in the network, and initiate transmission of the cached and encrypted second authorization key with the cached and encrypted resource from the cache to at least one authorized entity.

According to another embodiment, an apparatus comprises means for determining a first authorization key for a user and a second authorization key for a resource. The apparatus also comprises means for encrypting the resource with the second authorization key, and encrypting the second authorization key with the first authorization key. The apparatus further comprises means for initiating distribution of the encrypted second authorization key with the encrypted resource over a network. The apparatus further comprises means for initiating caching the encrypted second authorization key with the encrypted resource in a cache in the network, and initiating transmission of the cached and encrypted second authorization key with the cached and encrypted resource from the cache to at least one authorized entity.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION SOME EMBODIMENTS

A method and apparatus for building a scalable service platform by initiating transmission of encrypted data from a public network cache are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "resource" refers to data. A resource is a piece of data that a service provides to its users or allows its user to share. Although various embodiments are described with respect to an access control application. It is contemplated that the approach described herein may be used with other platforms or services.

Figure 1:
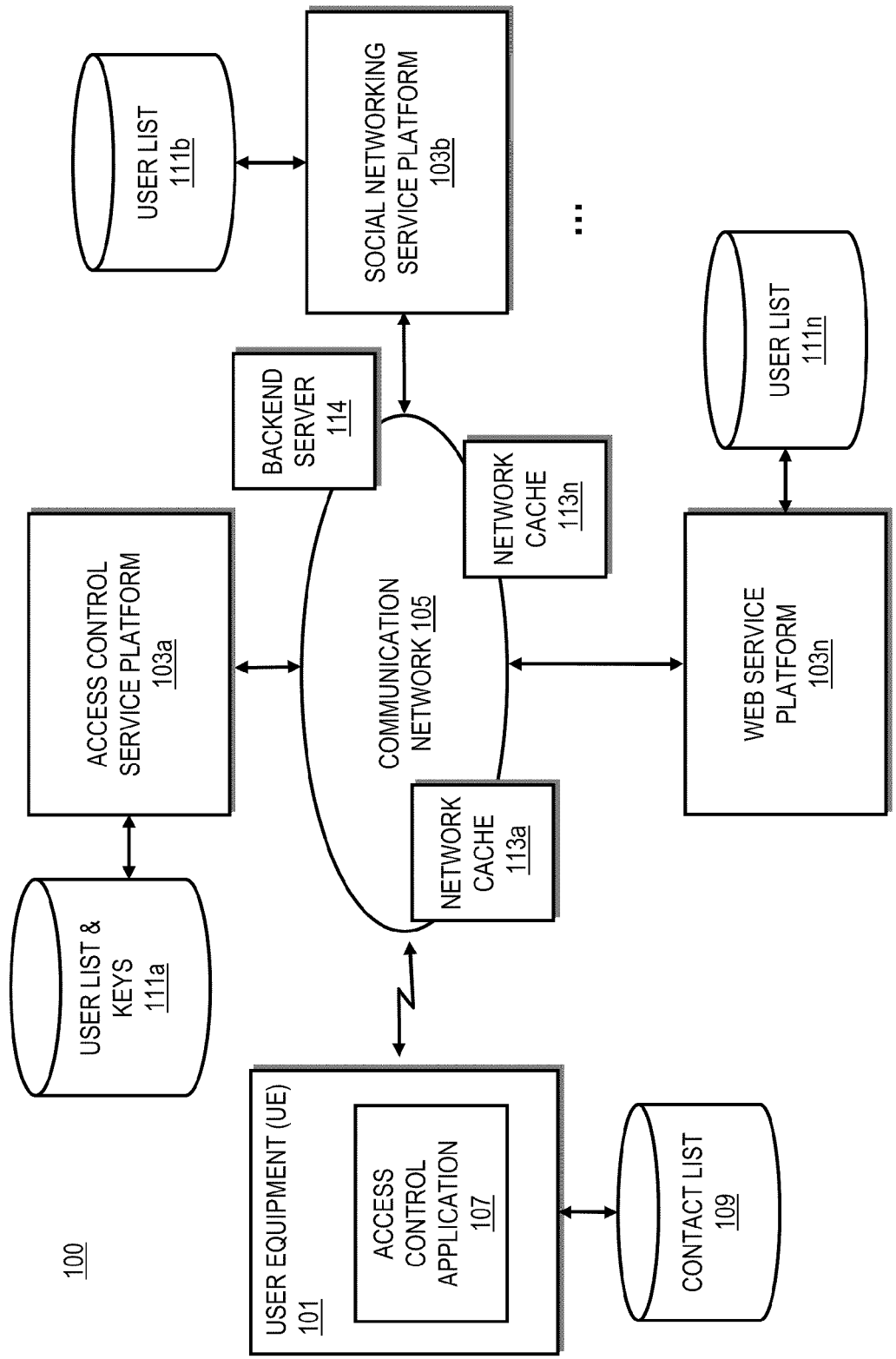
FIG. 1 is a diagram of a system capable of building a scalable service platform by initiating transmission of encrypted data from a public network cache, according to one embodiment.

FIG. 1 is a diagram of a system capable of building a scalable service platform by initiating transmission of encrypted data from a public network cache, according to one embodiment. With respect to the sharing of content, users can encrypt the shared information to limit access to certain other user(s). Typically, such content can reside on backend servers. Consequently, the usage of encryption introduces a heavy workload on these backend servers that host the services. Such burden can translate into degraded user experience; e.g., the user faces delay in the retrieval and display of shared data. Moreover, the conventional caching approach works only for public data, which the server does not place any access controls upon.

However, this approach is inadequate for consumer internet services, where user data are made available only to authorized users. There are many proprietary systems that support access control on, for example, hypertext transfer protocol (http) caches/proxies. These approaches are not ideal, in that different backend servers/services would have different logic for implementing access control. In this environment, synchronizing the http caches/proxies is impractical in terms of cost. For example, a typical backend server utilized in content sharing services can have hundreds of millions of entries in its user database, such that replication of such database to various caches/proxies while maintaining data synchronization is an extremely difficult task.

To address this problem, a system 100 of FIG. 1 introduces the capability to build a scalable service platform by initiating transmission of encrypted data from a public network cache. With proper caching, data sharing requests from users do not actually reach their intended servers; instead, the requests are fulfilled by a cache located somewhere along the path between the users and the server.

As shown in FIG. 1, the system 100 comprises a user equipment (UE) 101 having connectivity to an access control services platform 103*a*, a social network service platform 103*b*, and a web service platform 103*n* via a communication network 105. A network cache 113 can be located anywhere between the UE 101 and a backend server 114, which can include server side accelerators, content delivery networks, organizational http proxies, client side browser caches, etc. According to certain embodiments, the network cache 113 can be used as public cache that is generally accessible over a public data network, such as the global Internet.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

This system 100 builds a scalable service platform by using encryption for authentication, authorization and data protection. According to certain embodiments, the system 101 can be adapted to provide representational state transfer (REST) services and other styles of internet services. Representational state transfer (REST) is a style of software architecture for distributed hypermedia systems such as the World Wide Web. As such, it is more than a method for building "web services." REST refers to a collection of network architecture principles that outline how resources are defined and addressed, and can include any simple interface that transmits domain-specific data over http, without an additional messaging layer such as SOAP or session tracking via http cookies.

By way of example, the system 100 adopts RESTful service principles. In this manner, for internet services, scalability can be readily achieved for public resources. This is because public resources can be easily placed at various internet caches along the path from user equipment to servers. The main cost, among other costs, for a service platform stems from the need to utilize protected resources, which entails providing user authentication, resource authorization, and optionally data privacy protection. Typically, protected resources cannot be placed at internet caches, because these caches are unaware of authentication and authorization rules that are often specified proprietarily by the hosting servers of these resources.

According to certain embodiments, the system 100 'converts" or transforms protected resources into cache-friendly public resources. As such, protected resources are encrypted, and encryption keys are only distributed to authorize users. Thus, the encrypted resources can be safely placed on public network caches 113*a*, which can reside, e.g., within content delivery networks. Consequently, users who do not have encryption keys cannot use these encrypted resources in any meaningful way. For users who possess keys, they can retrieve desired resources from the cache 113*a*, in similar fashion to how they retrieve public resources. Once the resources are retrieved, however, the users can decrypt the downloaded encrypted resource with the appropriate keys. The system 100 effectively moves the security policy enforcement point from centralized points of backend servers to many distributed clients/caches 113. In the case of consumer internet services, there can be typically hundreds of millions of users, and even greater requests emanating from such users for content. Thus, the overall efficiency gain can be very significant.

By way of example, the UE 101, the access control services platform 103*a*, the social network service platform 103*b*, and the web service platform 103*n* communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The access control service platform 103a, the social network service platform 103b . . . and the web service platform 103n can be implemented via shared or partially shared hardware equipment or different hardware equipments.

In various embodiments, the communication network 105 allows the access control platform 103a to synchronize an existing user list (e.g., the contact list database 109 or user lists 111 of other service platforms 103b, 103n) or create a new user list in the database 111 with the contact database 109 of the UE 101. For example, the access control platform 103a may collect online personal information management (e.g., Google®, Yahoo®, etc.) including management of user contacts. It is contemplated that the access control platform 103a may include in any service including at least in part a contact list.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
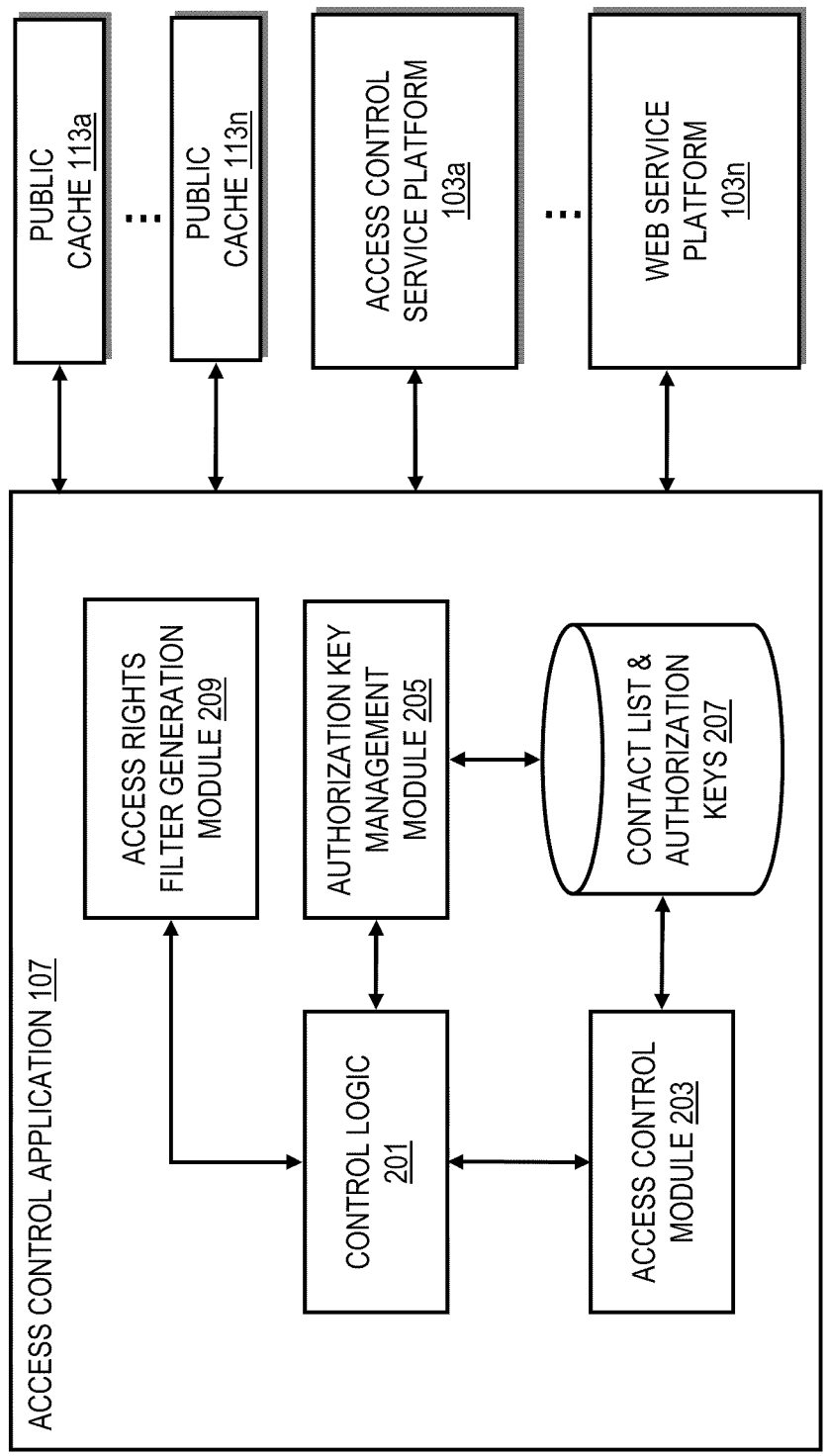
FIG. 2 is a diagram of the components of an access control application, according to one embodiment.

FIG. 2 is a diagram of the components of an access control application 107 (e.g., widget), according to one embodiment. Widgets are light-weight applications, and provide a convenient means for presenting information and accessing services. It is contemplated that the functions of these components may be combined in one or more components or performed by other components of equivalent functionality. Alternatively, the functions of the access control application 107 can be implemented via the access control service platform 103a according to another embodiment.

By way of example, the access control application 107 includes one or more components for providing a scalable service platform by initiating transmission of encrypted data from a public network cache. It is contemplated that the functions of these components may be combined in one or more components or performed by other components of equivalent functionality. In this embodiment, the access control application 107 includes a control logical 201 for controlling the operations of the components within the access control application, an access control module 203 for control access to shared data, an authorization key management module 205 for managing authorization keys, and an access right filter ("ARF") generation module 209 for generating ARFs. Both the access control module 203 and the authorization key management module 205 are connected to a contact list and authorization key database 207.

Figure 3:
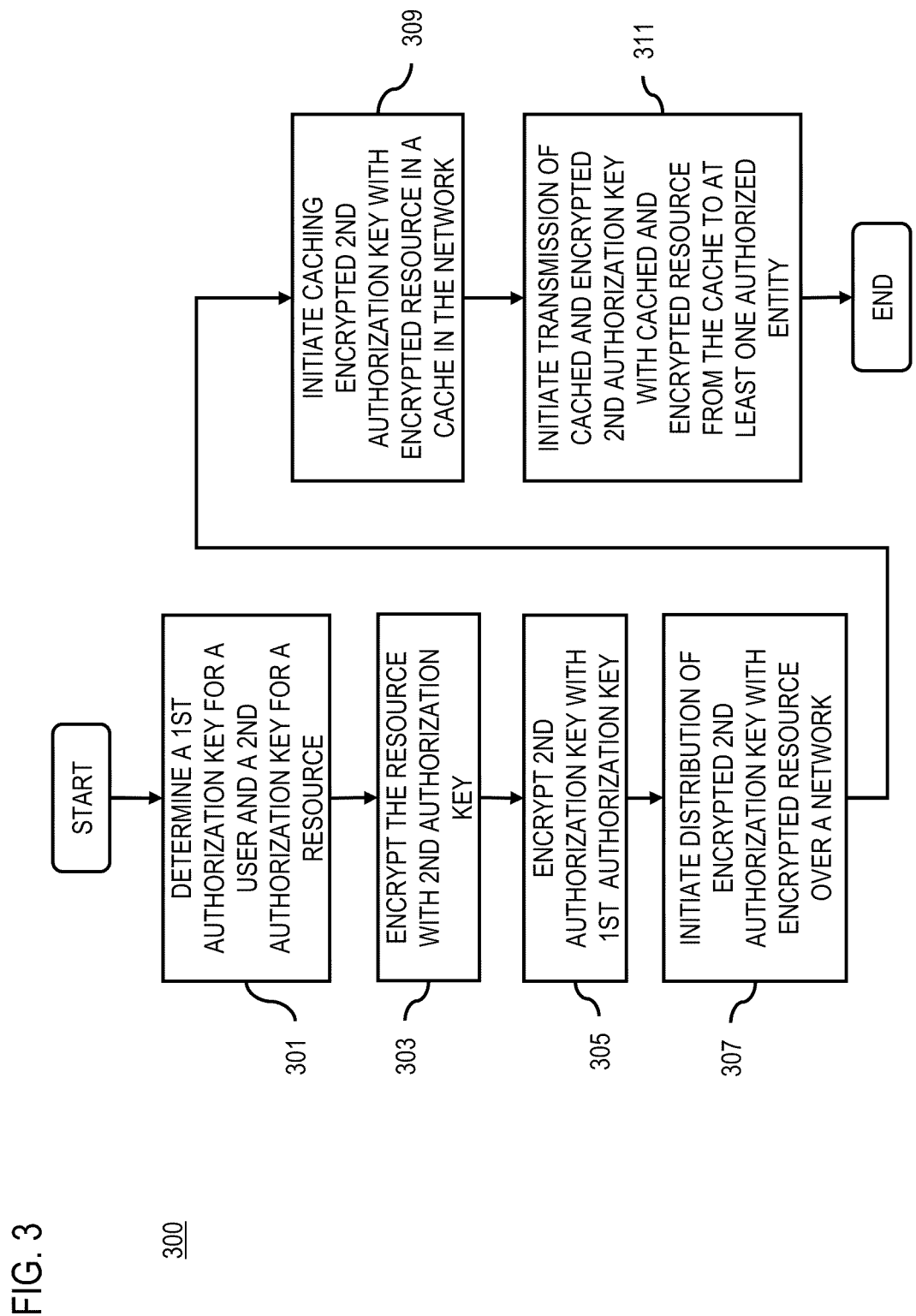
FIG. 3 is a flowchart of a process for controlling access to encrypted data, according to one embodiment.

FIG. 3 is a flowchart of a process for controlling access to encrypted data, according to one embodiment. In one embodiment, the access control application 107 performs the process 300 and is implemented in, for instance, a chip set including a processor and a memory as shown FIG. 10. In step 301, the access control application 107 determines a first authorization key for a user (e.g., when the user signs up to the access control service platform 103a) and a second authorization key for a resource (e.g., when the user upload the resource to the access control service platform 103a). The access control application 107 encrypts the resource with the second authorization key, (Step 303), and encrypts the second authorization key with the first authorization key (Step 305). The access control application 107 then initiates distribution of the encrypted second authorization key with the encrypted resource over a network (Step 307). Thereafter, the access control application 107 initiates caching the encrypted second authorization key with the encrypted resource in a cache in the network (Step 309), and initiates transmission of the cached and encrypted second authorization key with the cached and encrypted resource from the cache to at least one authorized entity (Step 311).

Alternatively, the user publishes a URL to the resource on the access control service platform 103a. Consequently, any user can request this URL, in which the request can be mostly served at caches rather than at an original server where the access control service platform 103a resides.

Figure 4:
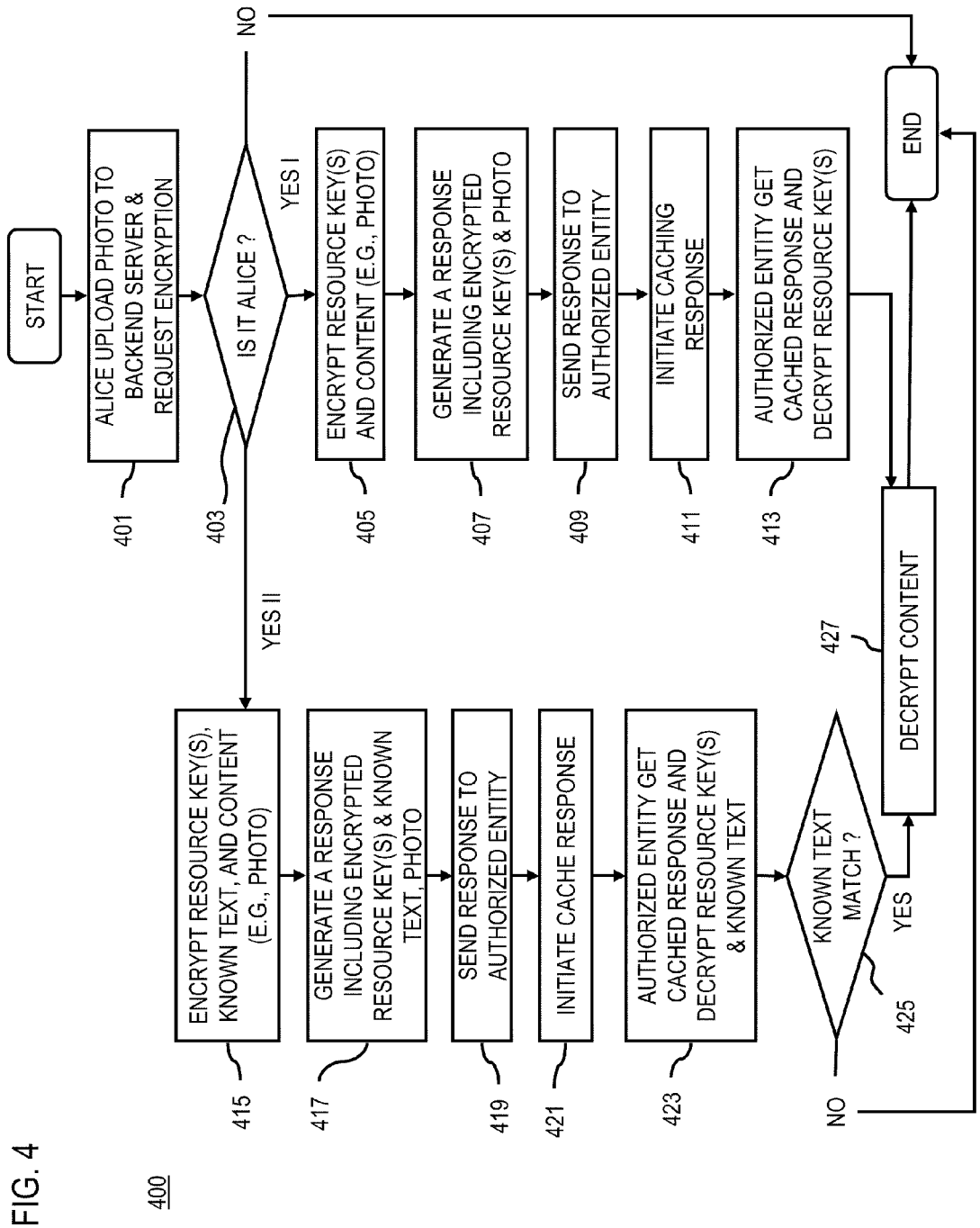
FIG. 4 is a flowchart example utilizing the processes of FIG. 3, according to various scenarios.

FIG. 4 is a flowchart example utilizing the process 300 of FIG. 3, according to various scenarios. For the purposes of illustration, users Alice and Bob seek to share photos. In Step 401, Alice uploads photos to the access control service platform 103a of, for example, backend server 114, to be encrypted so as to share the photos with her contacts. The access control service platform 103a authenticates the user by a user name, a password, etc. to determine whether the user is Alice (Step 403). If the user is not Alice, the access control service platform 103a ends the process 300.

If the user is Alice, in one scenario (YES I of Step 403), the access control service platform 103a generates a key for Alice and a key for resource. The key for Alice is usually not specific to any resources. As mentioned, the key for Alice can be generated when Alice signs up to the access control service platform 103a for the first time. In Step 405, the access control service platform 103a encrypts the uploaded a photo and the second authorization keys. The photo is /photos/123 and owned by Alice. As such, no other user except Alice is allowed to view the photo. The key for the resource (in this example, is a photo) is specific to the photo rather than to Alice. By way of example, the key for resource is the MD5 hash of the photo. MD5 is more fully detailed in Internet Engineering Task Force (IETF) Request for Comment (RFC) 1321, which is incorporated by reference in its entirety. The access control service platform 103a also adds a header in the response which specifies that only Alice can access to the photo. Thus, the content of the photo is as follows:

[[{Alice: AES(key for Alice, key for resource)}][AES(key for resource, resource)]]

Here AES(key, data) is the result of encrypting the data with the key using the Advanced Encryption Standard (AES) algorithm. The access control service platform 103a generates a secret key for every registered user. Therefore, the key for Alice is only shared by Alice and the access control service platform 103a. The access control service platform 103a generate a response with the above-described content (Step 407), i.e., the encrypted resource keys and the encrypted photo, and then distributes the response via the internet and caches anywhere on the internet (Step 409) to initiate caching the response (Step 411). Most requests for the encrypted photo is replied by an internet cache, and do not reach the original backend server that encrypts the photo. Although the response is cached in internet caches and available for other users to retrieve, only Alice can use the response, because only Alice has her key to decrypt the header (Step 413) and acquires the key for resource (i.e., the photo) to decrypt the photo (Step 427). The cache may be the one that is closest to Alice's user equipment, or a least busy one, or a randomly selected one.

In another embodiment, the header and the encrypted resource are separated into two responses. This approach works especially well for resources with relatively large sizes, such as music or video clips. By way of example, while encrypted resources are placed on caches that are out the control of backend servers, light-weight headers are placed on caches (e.g., server-side accelerators, etc.) for auditing purposes.

In another scenario (still YES I of Step 403), Alice requests the access control service platform 103a to allow Bob share the photo. The access control service platform 103a thus adds a new entry to the header section for Bob, updates the version of the photo as /photos/123v=2 so as to be accessed by Alice and Bob but no one else. The old version photo: /photos/123 is still in caches until it is purged. The content of the second version of the photo is as follows:

[[{Alice: AES(key for Alice, key for resource)}, {Bob: AES(key for Bob, key for resource)}][AES(key for resource, resource)]]

In another embodiment, the access control service platform 103a removes user information from headers, when the information of who have access to a resource is sensitive for some resources. Then Alice or Bob can use their individual key to decrypt the encrypted resource key, and then use the key for resource to decrypt the encrypted photo.

By analogy, Alice can share the photo with one of her social groups (e.g., her college classmates including Leslie). The access control service platform 103a also maintains a secret key for every social group of Alice. The key for a social group is shared by all the members in the social group. Therefore, like sharing with Bob, the access control service platform 103a adds another entry to the header for the social group and updates the version of the photo as: /photos/123v=3. The content of the third version of the photo is as follows:

[[{Alice: AES(key for Alice, key for resource)}, {Bob: AES(key for Bob, key for resource)}, {classmates: AES (key for classmates, key for resource)}][AES(key for resource, resource)]]

Leslie has the key for classmates because she belongs to this social group. Therefore, the photo can be accessed only by Alice, Bob and members (including Leslie) in the social group.

In another scenario (YES II of Step 403), the access control service platform 103a further encrypts a known text (such as Alice's first pet name: Fluffy) with the key of resource (Step 415), and then generates, sends and initiates a caching response (including encrypted known text) in Steps 417, 419 and 421 as in the YES I route. Therefore, when Alice uses the UE 101 to retrieve the response from a cache, the UE 101 decrypts the encrypted resource key and the encrypted know text (Step 423) before decrypting the encrypted resource. By checking the decrypted known face (Step 425), Alice knows whether the resource is intended for her before taking the time and effort to initiate decryption the encrypted resource (which may include hundreds of photos, and thus, time consuming). Next, Alice confirms that the decrypted text matches with her known text, and the UE 101 decrypts the encrypted resource (Step 427). If the decrypted known text matches with her known text, the UE 101 ends the process. Therefore, Alice does not have to blindly try to decrypt potentially large amount of resource. The content of this version of the photo is as follows:

[[AES(key for Alice, key for resource), AES(key for Bob, key for resource)][AES(key for resource, "a known text")][AES(key for resource, resource)]]

In another scenario, when Alice modifies the photo and removes Bob from the access list and modifies the photo, the access control service platform 103a updates the version of the photo as: /photos/123v=4 and removes Bob from the header. The content of the fourth version of the photo is as follows:

[[{Alice: AES(key for Alice, key for resource)}, {classmates: AES(key for classmates, key for resource)}] [AES(key for resource, resource)]]

Figure 6B:
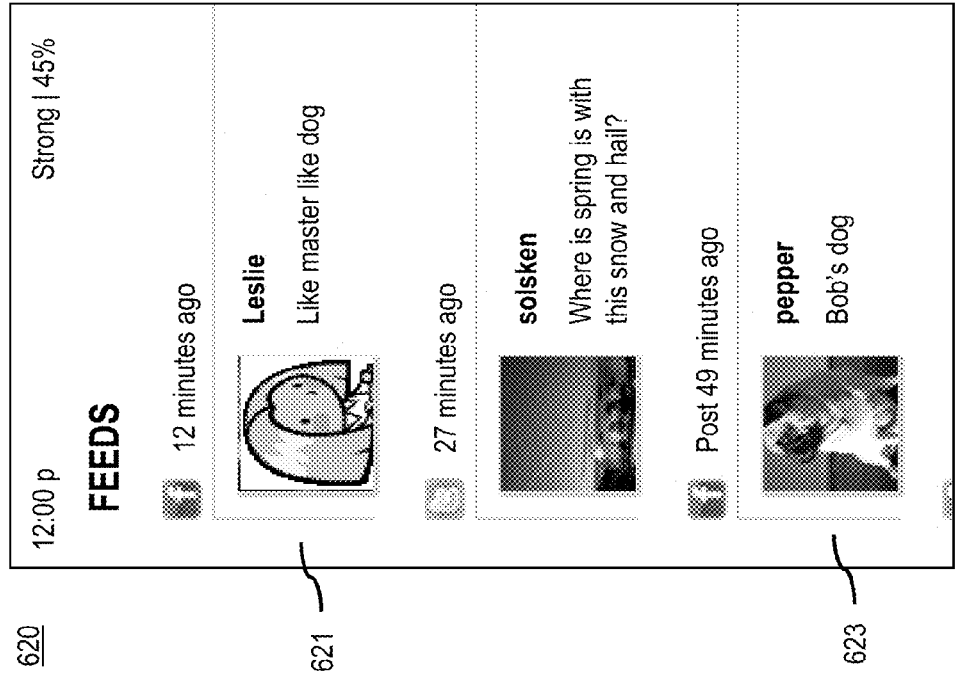
FIGS. 6A-6B are diagrams of user interfaces utilized in the process of FIG. 3, according to one embodiment.
Figure 6A:
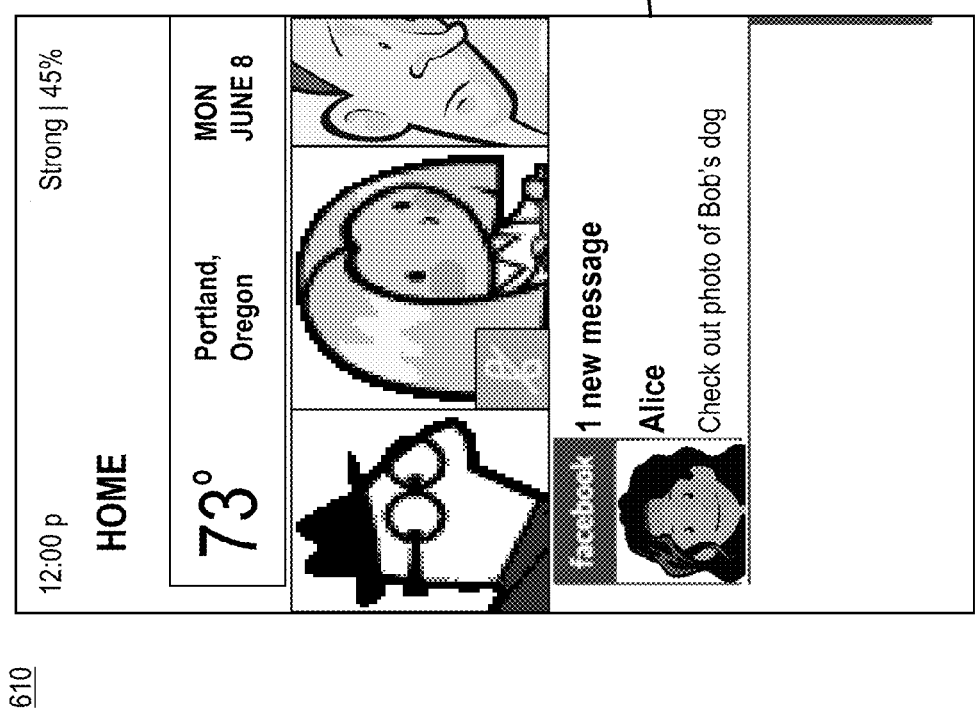

FIGS. 6A-6B are diagrams of user interfaces of the UE 101 utilized in the process of FIG. 3, according to one embodiment. In this example, Alice shares with Bob and a social group including Leslie the following: (1) a photo of Bob's dog that she took during her visit to Bob's apartment and (2) her comment of "Check of photo of Bob's dog," which are shown in section 611 of the screen 610 on Lisle's user equipment (FIG. 6A) after Leslie retrieves the photo. Leslie then replies to Alice with her comments of "Like master like dog" (Section 621 of the screen 620 of Alice's user equipment in FIG. 6B) attached to the photo (Section 623 of the screen 620 of Alice's user equipment in FIG. 6B). For example, Alice thinks that Bob will not be happy to see Leslie's comment with the photos, and thus removes Bob's name from the response.

If Bob tries to access the fourth version of the photo, he cannot do so because there is no way for him to acquire the key that is used to encrypt the modified photo anymore. However, Bob may already have downloaded the third version of the photo to his local computer, and has a copy of it.

The system 100 can co-exists with the traditional approach of placing security policy enforcement on backend servers 114. The system 100 helps reading protected data. When writing public data, the conventional access control mechanisms are still used. For typical consumer internet services, there are much more read requests than write requests on a resource. Resource versioning are used when a resource is modified which introduces some overhead on servers.

Figure 5:
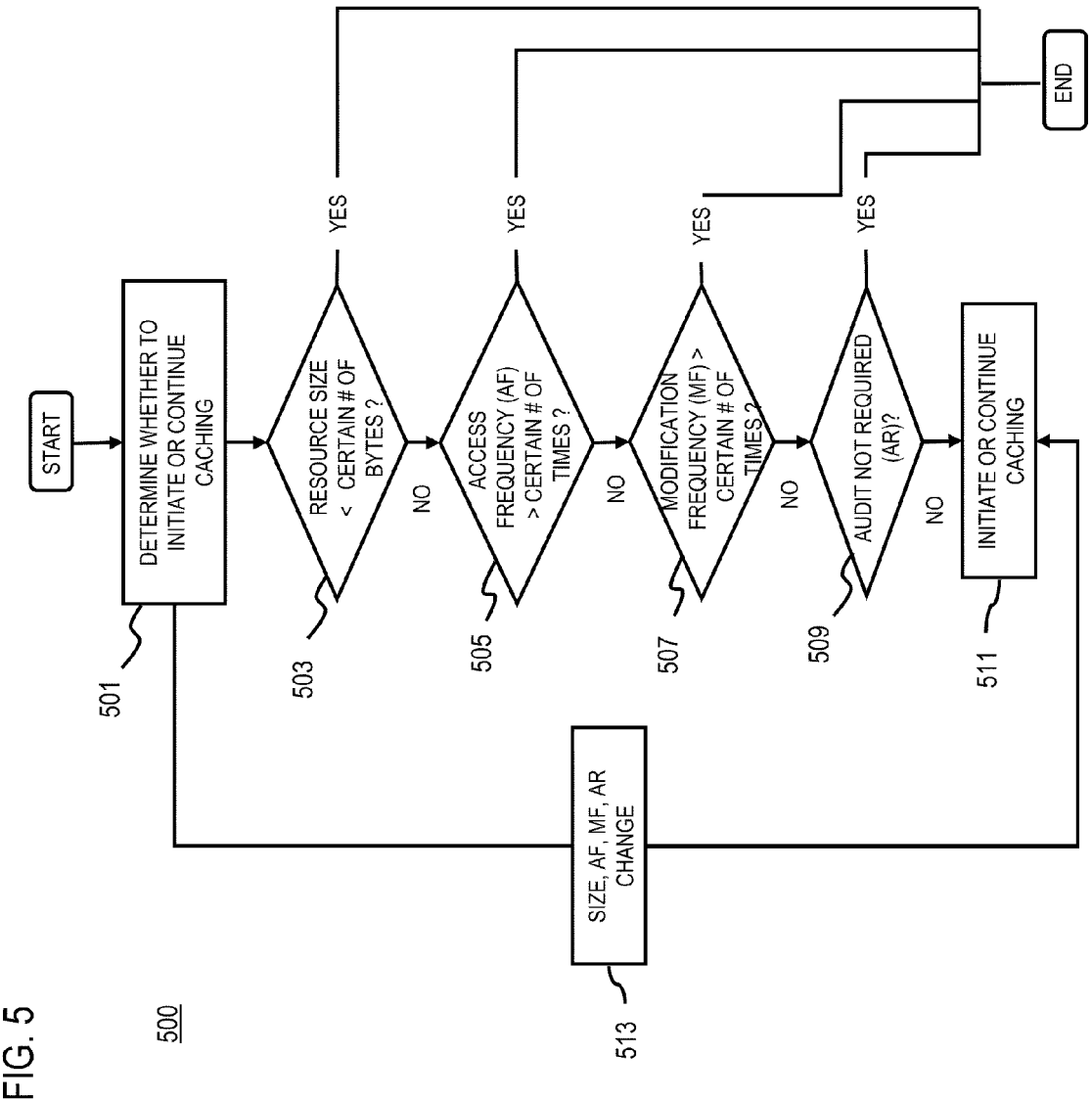
FIG. 5 is a flowchart of a process for determining whether to initiate or continue caching encrypted data in the process of FIG. 3, according to one embodiment.

FIG. 5 is a flowchart of a process 500 for determining whether to initiate caching or continue caching encrypted data in the process of FIG. 3, according to one embodiment. The access control service platform 103a categorizes resource based on its context, which forecasts how many times the resource is likely to be downloaded. By way of example, that context information is that the user schedules many meetings on that topic, so that the user will probably access the resource many times. Therefore, caching is employed.

It is noted that context information can impact the processing capacity in backend servers 114. For example, if a resource changes frequently, resource versioning introduces overhead. Also, if the size of resources is very small, resource headers pose significant overhead. Further, if a resource needs to be audited, e.g., to know when and how many times the resource is accessed, the process 300 distorts such information.

In view of these considerations, the access control service platform 103a utilizes the process 500 on each resource to determine whether to use the process 300 or a conventional access control method. In one embodiment, the process 500 is checked each time a resource is created or modified (including modifying access rights to users). Different consideration of the process 500 for determine whether to initiate or continue caching the resource (Step 501) includes: whether the resource size is and/or will be smaller than a predetermined number of bytes (Step 503), whether an access frequency of the resource is and/or will be greater than a predetermined number of times (Step 505), whether an modification frequency of the resource is and/or will be greater than a predetermined number of times (Step 507), and whether the resource does not and/or will not require to be audited (Step 509).

If the overhead introduced by caching grows over a predefined threshold value because of too frequent modifications, etc. such that one of decisions (Steps 503-509) is YES, the access control service platform 103a ends the process 500. However, if all of the determination are NO, the access control service platform 103a initiates or continues caching the resource (Step 511).

The access control service platform 103a automatically monitors the usage behavior of a resource or a type of resources. Whenever the size, access frequency, modification frequency and audit requirement of the resource is changed (Step 513), the access control service platform 103a proceeds to the process 500. By way of example, a resource needs to be audited in the beginning. For this reason, the determination yields NO. Later, the process determines that it is better to move the audit to some other related resources. For example, the concerned resource is an image and can appear in some web pages. To audit only the hosting web pages is a better auditing approach, in which case the determination is YES.

Another benefit of the described arrangement is that the users do not have to know the details on how a data sharing request is fulfilled. Thus no changes are needed on client codes to utilize the process 300.

The process 300 further support a method of distributing Access Rights Management using Right Filters (ARFs), by defining how to implement ARFs in an easy and secure way.

Figure 7:
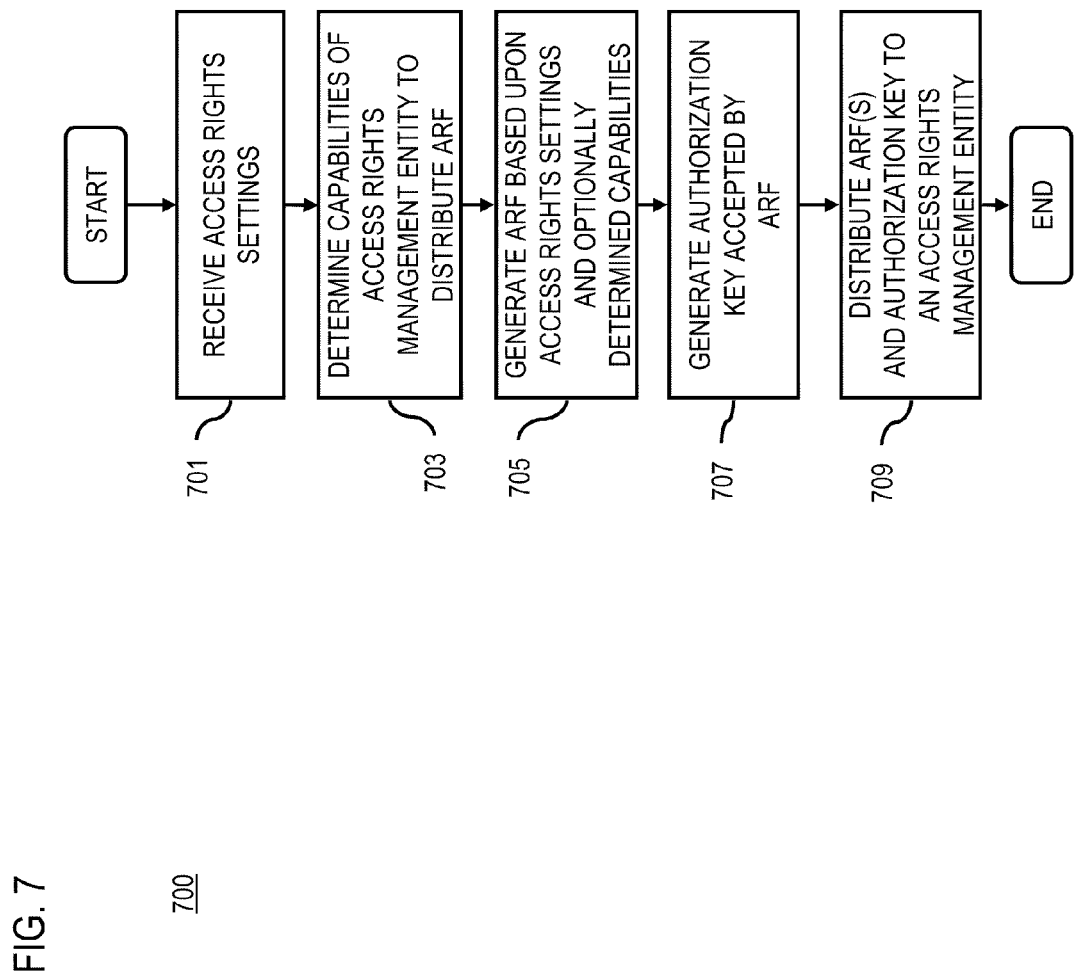
FIG. 7 is a flowchart for providing distributed access rights management using access right filters, according to one embodiment.
Figure 8:
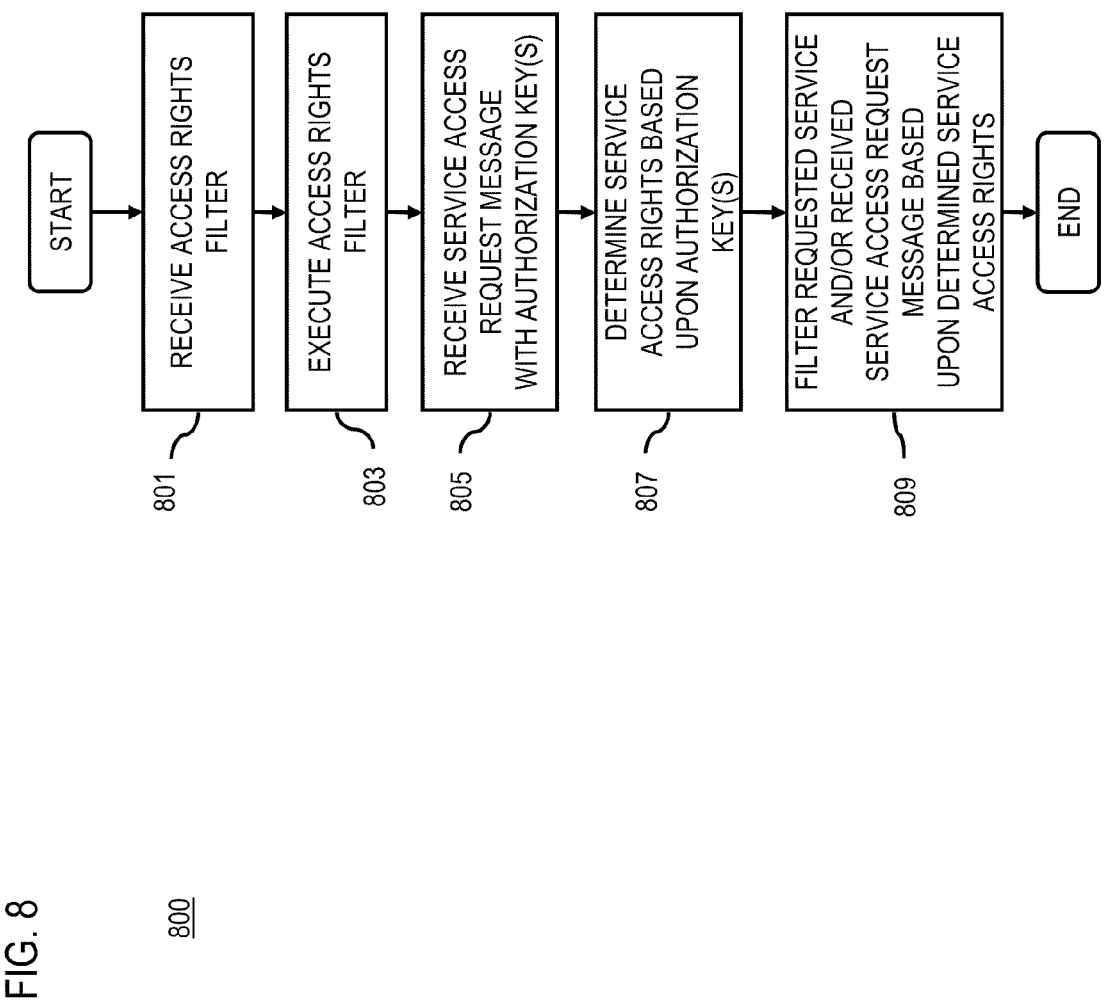
FIG. 8 is a flowchart for providing distributed access rights management using authorization key(s), according to one embodiment.

Referring back to the access right filter generation module 209 in FIG. 2 for generating ARFs, FIGS. 7-8 are flowcharts of an access rights filter generation process executed by the access rights filter generation module 209, according to certain embodiments.

FIG. 7 is a flowchart for providing distributed access rights management using access right filters, according to one embodiment. The process may be performed by either the access control service platform 103a or the access control application 107. The access right filter generation module 209 of the access control application 107 receives access right setting (Step 701). In Step 703, which is optional, the access right filter generation module 209 determines capabilities of an access rights management entity (e.g., the backend server, etc.) to which an access rights filter is to be distributed. The access right filter generation module 209 then generate an access rights filter based upon received access rights settings and any optionally determined capabilities of the access rights management entity (Step 705). The access control application 107 generates an authorization key accepted by the generated access rights filter (Step 707). The access control application 107 then distributes one or more of the access rights filter and authorization key to an access rights management entity (Step 709).

FIG. 8 is a flowchart for providing distributed access rights management using authorization key(s), according to one embodiment. The access control service platform 103a or the public cache 113 receives an access rights filter externally from the access control application 107 (Step 801) and executes the access rights filter (Step 803). In step 805, the access control service platform 103a or the public cache 113 receives a service access request message comprising one or more authorization keys, and determines service access rights based upon the one or more authorization keys (Step 807). The access control service platform 103a or the public network cache 113 then filters the requested service and/or received service access request message based upon determined service access rights (Step 809). By way of example, the Access Right Filters (ARFs) is configured as a response with content of AES(key, data) as described above.

As such, in certain embodiments, the described processes provide several advantages for owners of services and other resources to protect their resources by restricting access to the resources to trusted users based upon access rights definitions. In this regard, content and service owners may generate distributable access rights filters configured to grant or otherwise filter access to content based upon received authorization keys recognized by the access rights filters. These authorization keys are also distributable such that authorization keys may be distributed only to trusted users. Rather than define a plurality of listings of users with each list having associated access rights permissions, a content owner may instead generate one or more ARFs defining access rights levels and distribute authorization keys to trusted users without having to manually add new users to a centralized access rights list.

The processes described herein for providing building a scalable service platform by initiating transmission of encrypted data from a public network cache may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

Figure 9:
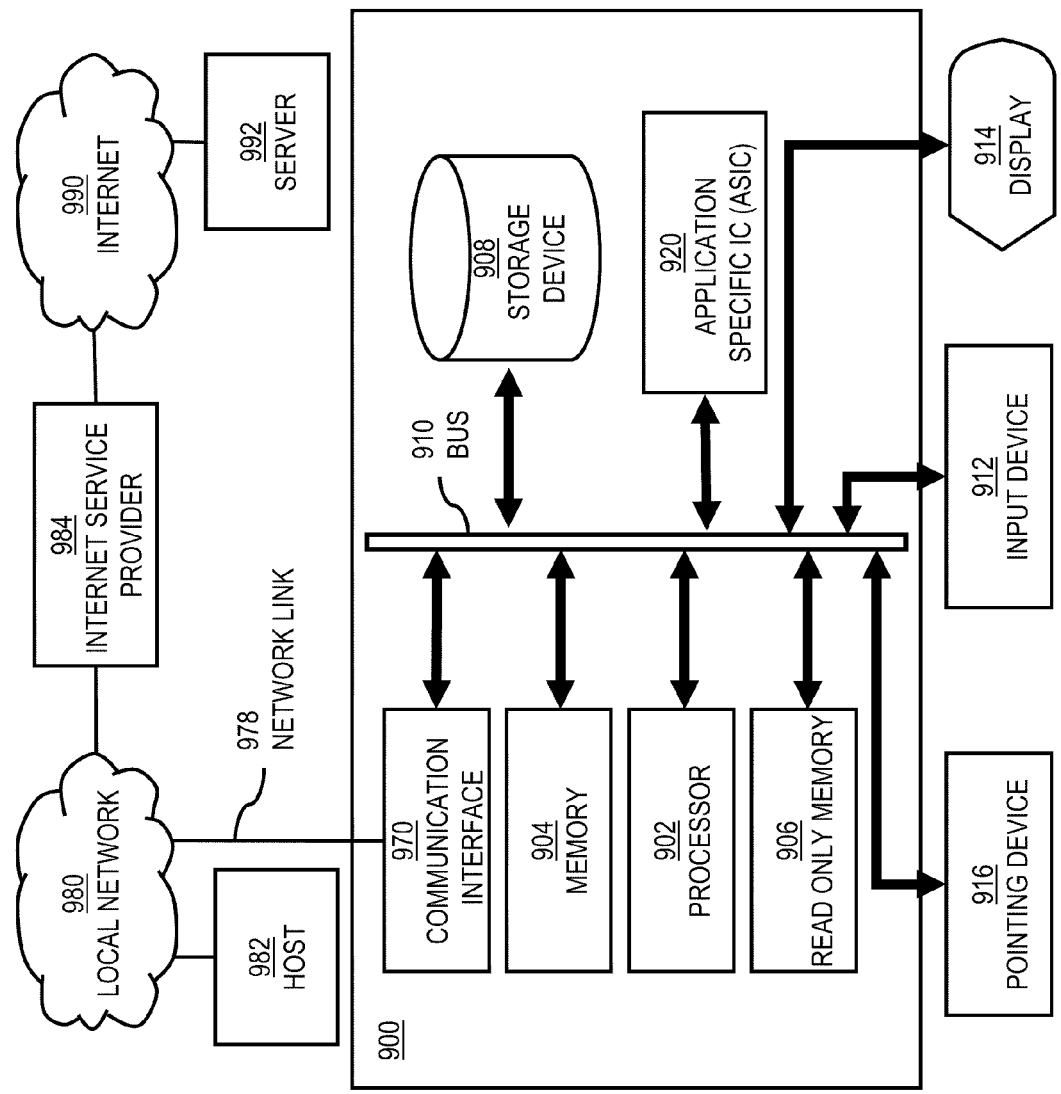
FIG. 9 is a diagram of hardware that can be used to implement an embodiment of the invention.

FIG. 9 illustrates a computer system 900 upon which an embodiment of the invention may be implemented. Computer system 900 is programmed to building a scalable service platform by initiating transmission of encrypted data from a public network cache as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information related to building a scalable service platform by initiating transmission of encrypted data from a public network cache. The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for building a scalable service platform by initiating transmission of encrypted data from a public network cache. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for building a scalable service platform by initiating transmission of encrypted data from a public network cache, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for building a scalable service platform by initiating transmission of encrypted data from a public network cache to the UE 101.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 10:
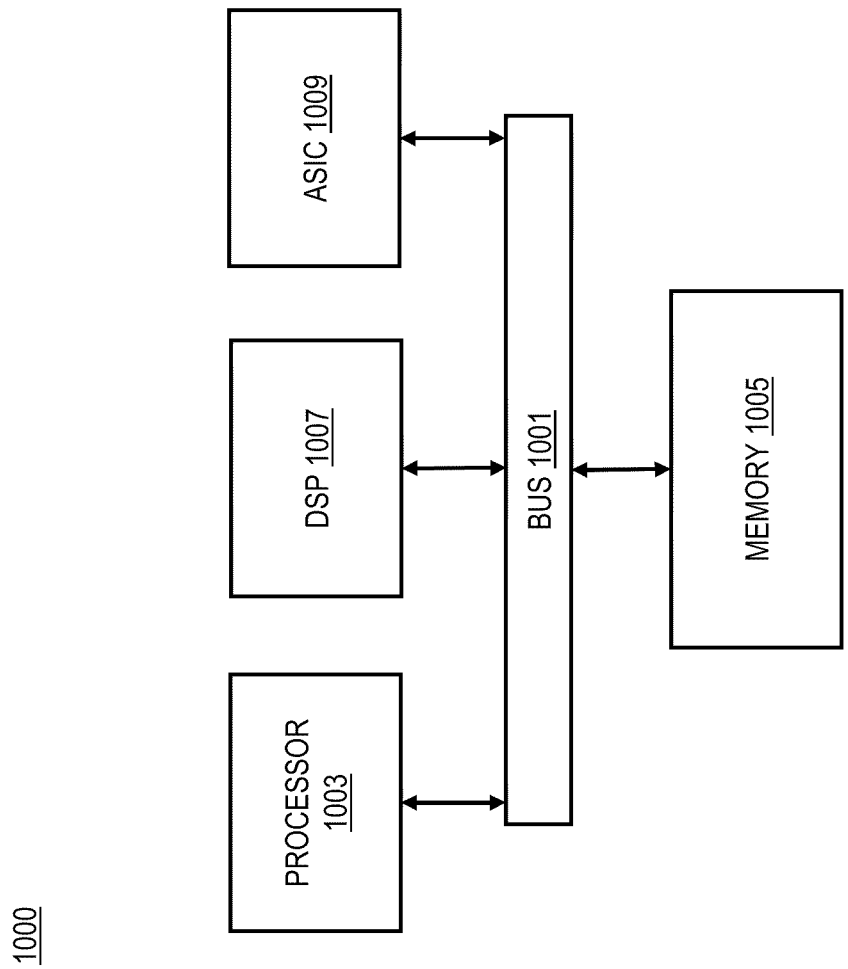
FIG. 10 is a diagram of a chip set that can be used to implement an embodiment of the invention.

FIG. 10 illustrates a chip set 1000 upon which an embodiment of the invention may be implemented. Chip set 1000 is programmed to building a scalable service platform by initiating transmission of encrypted data from a public network cache as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to building a scalable service platform by initiating transmission of encrypted data from a public network cache. The memory 1005 also stores the data associated with or generated by the execution of the inventive steps.

Figure 11:
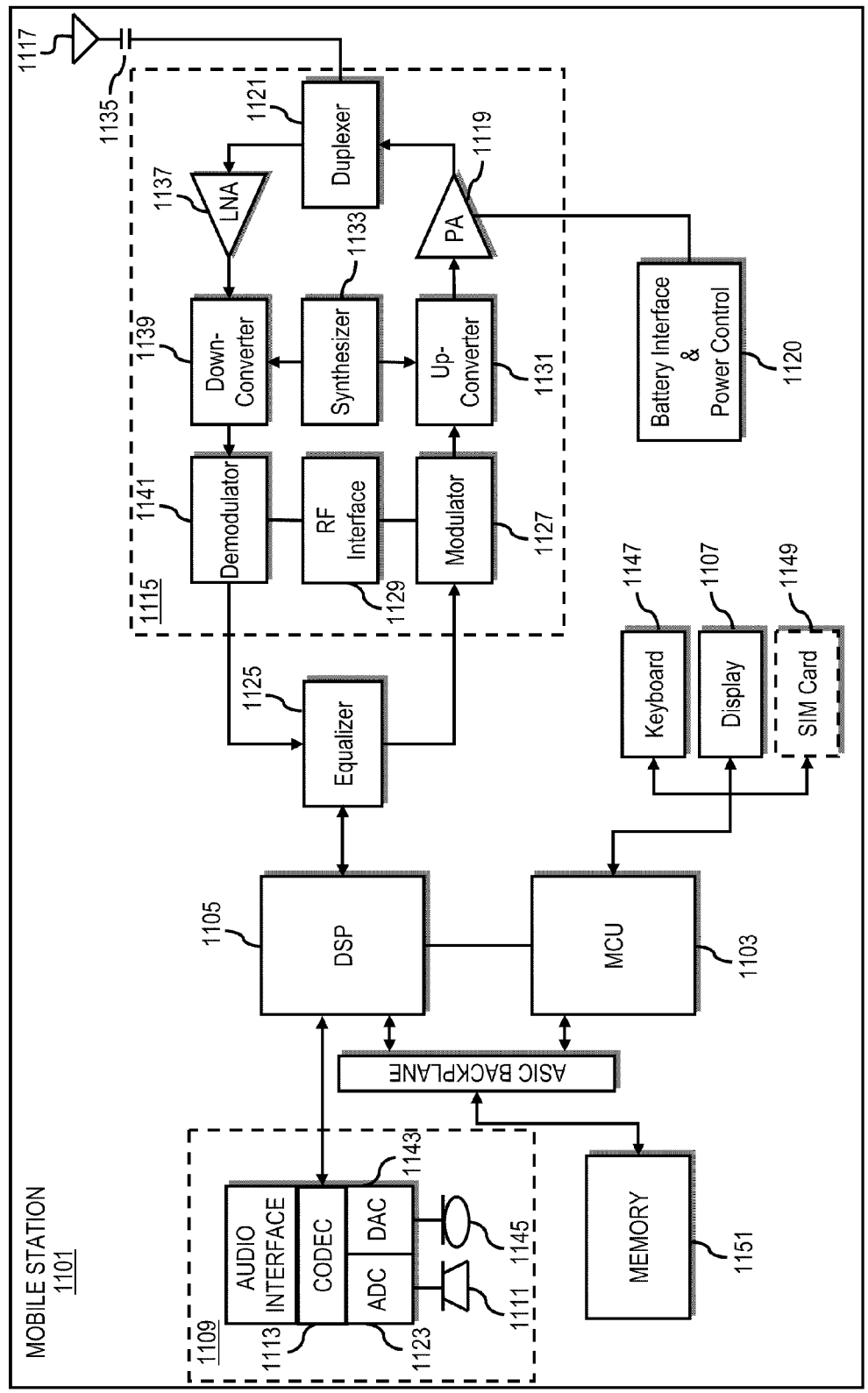
FIG. 11 is a diagram of a mobile station (e.g., handset) that can be used to implement an embodiment of the invention.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to building a scalable service platform by initiating transmission of encrypted data from a public network cache. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

The system 100 significantly lowers the overall cost for maintaining backend servers that host large scale consumer internet services. It requires no any changes on public network caches, but only requires backend servers and clients to be slightly updated.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining a first authorization key for a user and a second authorization key for a resource;
   encrypting the resource with the second authorization key;
   encrypting the second authorization key with the first authorization key;
   encrypting a text known to at least one authorized entity with the second authorization key;
   initiating distribution of the encrypted text with the encrypted second authorization key and the encrypted resource over a network;
   initiating caching of the encrypted text with the encrypted second authorization key and the encrypted resource in a cache in the network; and
   initiating transmission of the cached and encrypted text with the cached and encrypted second authorization key and the cached and encrypted resource from the cache to the authorized entity, wherein the encrypted second authorization key is decrypted with the first authorization key, the encrypted text is decrypted with the decrypted second authorization key, and the encrypted resource is decrypted with the decrypted second authorization key when the decrypted text matches with the text known to the authorized entity.

2. A method according to claim 1, further comprising:
   decrypting the encrypted second authorization key with the first authorization key; and
   decrypting the encrypted resource with the decrypted second authorization key.

3. A method according to claim 1, wherein the at least one authorized entity is associated with the first authorization key, and wherein the at least one entity includes at least one of an owner of the resource, a contact of the owner, or a social group the owner belongs to.

4. A method according to claim 1, further comprising:
   categorizing a plurality of resources by at least one of a data size, an access frequency, a modification frequency, an auditing requirement, or a combination thereof; and
   determining a threshold value within each category for the caching step to apply to the resources,
   wherein the caching step is applied to resources that meet the threshold values within the respective category, and
   the encrypted second authorization key with the encrypted resource remain cached when the resources remain meeting the threshold value in the respective category.

5. A method according to claim 3, further comprising:
   removing one authorized entity to prevent subsequent transmission of the cached and encrypted second authorization key as well as the cached and encrypted resource from the cache.

6. A method according to claim 3, wherein members of the social group share an identical first authorization key specific for the social group.

7. An apparatus comprising:
   at least one processor; and
   at least one memory including computer program code,
   wherein the at least one memory and the computer program code configured to, with the at least one processor, cause the apparatus to perform at least the following:
   determine a first authorization key for a user and a second authorization key for a resource;
   encrypt the resource with the second authorization key;
   encrypt the second authorization key with the first authorization key;
   encrypt a text known to at least one authorized entity with the second authorization key;
   initiate distribution of the encrypted text with the encrypted second authorization key and the encrypted resource over a network;
   initiate caching of the encrypted text with the encrypted second authorization key and the encrypted resource in a cache in the network; and
   initiate transmission of the cached and encrypted text with the cached and encrypted second authorization key and the cached and encrypted resource from the cache to the authorized entity, wherein the encrypted second authorization key is decrypted with the first authorization key, the encrypted text is decrypted with the decrypted second authorization key, and the encrypted resource is decrypted with the decrypted second authorization key when the decrypted text matches with the text known to the authorized entity.

8. An apparatus of claim 7, wherein the apparatus is further caused to:
decrypt the encrypted second authorization key with the first authorization key; and
decrypt the encrypted resource with the decrypted second authorization key.

9. An apparatus of claim 7, wherein the at least one authorized entity is associated with the first authorization key, and wherein the at least one entity includes at least one of an owner of the resource, a contact of the owner, or a social group the owner belongs to.

10. An apparatus of claim 7, wherein the apparatus is further caused to:
categorize a plurality of resources by at least one of a data size, an access frequency, a modification frequency, an auditing requirement, or a combination thereof;
determine threshold values within each category for the caching step to apply to the resources; and
cache resources that meet the threshold values in the respective category,
wherein the encrypted second authorization key with the encrypted resource remain cached when the resources remain meeting the threshold values in the respective category.

11. An apparatus of claim 9, wherein the apparatus is further caused to:
remove one authorized entity to prevent subsequent transmission of the cached and encrypted second authorization key as well as the cached and encrypted resource from the cache.

12. An apparatus of claim 9, wherein members of the social group share an identical first authorization key specific for the social group.

13. A non-transitory computer-readable storage medium carrying one or more sequences of one or more instructions which, when executed by one or more processors, cause an apparatus to perform at least the following:
determining a first authorization key for a user and a second authorization key for a resource;
encrypting the resource with the second authorization key;
encrypting the second authorization key with the first authorization key;
encrypting a text known to at least one authorized entity with the second authorization key;
initiating distribution of the encrypted text with the encrypted second authorization key and the encrypted resource over a network;
initiating caching of the encrypted text with the encrypted second authorization key and the encrypted resource in a cache in the network; and
initiating transmission of the cached and encrypted text with the cached and encrypted second authorization key and the cached and encrypted resource from the cache to the authorized entity, wherein the encrypted second authorization key is decrypted with the first authorization key, the encrypted text is decrypted with the decrypted second authorization key, and the encrypted resource is decrypted with the decrypted second authorization key when the decrypted text matches with the text known to the authorized entity.

14. A non-transitory computer-readable storage medium of claim 13, wherein the apparatus is caused to further perform:
decrypting the encrypted second authorization key with the first authorization key; and
decrypting the encrypted resource with the decrypted second authorization key.

15. A non-transitory computer-readable storage medium of claim 13, wherein the at least one authorized entity is associated with the first authorization key, and wherein the at least one entity includes at least one of an owner of the resource, a contact of the owner, or a social group the owner belongs to.

16. A non-transitory computer-readable storage medium of claim 13, wherein the apparatus is caused to further perform:
categorizing a plurality of resources by at least one of a data size, an access frequency, a modification frequency, an auditing requirement, or a combination thereof;
determining a threshold value within each category for the caching step to apply to the resources; and
caching resources that meet the threshold value in the respective category,
wherein the encrypted second authorization key with the encrypted resource remain cached when the resources remain meeting the threshold value in the respective category.

17. A non-transitory computer-readable storage medium of claim 15, wherein the apparatus is caused to further perform:
removing one authorized entity to prevent subsequent transmission of the cached and encrypted second authorization key as well as the cached and encrypted resource from the cache.

* * * * *